United States Patent
Genner et al.

(10) Patent No.: US 10,924,473 B2
(45) Date of Patent: Feb. 16, 2021

(54) TRUST STAMP

(71) Applicant: T STAMP INC., Atlanta, GA (US)

(72) Inventors: Gareth Neville Genner, Atlanta, GA (US); Andrew Gowasack, Atlanta, GA (US)

(73) Assignee: T STAMP INC., Atlanta, GA (US)

( * ) Notice: Subject to any disclaimer, the term of this patent is extended or adjusted under 35 U.S.C. 154(b) by 611 days.

(21) Appl. No.: 15/342,994

(22) Filed: Nov. 3, 2016

(65) Prior Publication Data
US 2017/0134366 A1     May 11, 2017

Related U.S. Application Data

(60) Provisional application No. 62/253,538, filed on Nov. 10, 2015.

(51) Int. Cl.
| | |
|---|---|
| *G06F 7/04* | (2006.01) |
| *H04N 7/16* | (2011.01) |
| *H04L 29/06* | (2006.01) |
| *G06Q 40/02* | (2012.01) |
| *G06Q 50/00* | (2012.01) |
| *G06F 16/951* | (2019.01) |
| *H04L 29/08* | (2006.01) |

(52) U.S. Cl.
CPC .......... *H04L 63/083* (2013.01); *G06F 16/951* (2019.01); *G06Q 40/025* (2013.01); *G06Q 50/01* (2013.01); *H04L 67/22* (2013.01)

(58) Field of Classification Search
CPC ..... H04L 63/083; H04L 67/22; G06F 16/951; G06Q 40/025; G06Q 50/01
See application file for complete search history.

(56) References Cited

U.S. PATENT DOCUMENTS

| | | | |
|---|---|---|---|
| 7,822,631 B1 * | 10/2010 | Vander Mey | G06Q 30/0201 705/7.29 |
| 8,010,460 B2 | 8/2011 | Work et al. | |
| 8,316,086 B2 * | 11/2012 | Ufford | G06Q 10/107 709/204 |
| 8,457,367 B1 | 6/2013 | Sipe et al. | |
| 9,070,088 B1 * | 6/2015 | Baveja | G06F 16/24578 |
| 9,147,117 B1 * | 9/2015 | Madhu | G06K 9/00335 |
| 9,262,725 B2 | 2/2016 | Butte et al. | |

(Continued)

FOREIGN PATENT DOCUMENTS

CN     103930921 A     7/2014

*Primary Examiner* — Darshan I Dhruv
(74) *Attorney, Agent, or Firm* — Morris, Manning & Martin, LLP; Daniel E. Sineway, Esq.

(57) ABSTRACT

The present invention relates generally to identity or trustworthiness verification for online users. More specifically, the present invention is a method of identity verification for online users combined with methodologies for evaluating or demonstrating trustworthiness. The present invention may integrate data values from social media, e-commerce, or other sources, which is obtained online into a single accessible report along with information obtained from the subscriber. An algorithm may then calculate these data values or subscriber information to determine its accuracy by comparing these data values with each other and with the subscriber information to generate a rating for the subscriber's trustworthiness with a numerical score referred to herein as a Trust Score or Trust Stamp.

13 Claims, 3 Drawing Sheets

(56) References Cited

U.S. PATENT DOCUMENTS

| | | | |
|---|---|---|---|
| 9,300,676 B2 | 3/2016 | Madhu et al. | |
| 9,721,147 B1* | 8/2017 | Kapczynski | G06Q 50/265 |
| 2004/0186906 A1* | 9/2004 | Torrant | H04L 47/70 |
| | | | 709/225 |
| 2006/0042483 A1* | 3/2006 | Work | G06F 16/24578 |
| | | | 101/91 |
| 2006/0212931 A1* | 9/2006 | Shull | H04L 63/104 |
| | | | 726/10 |
| 2009/0327054 A1 | 12/2009 | Yao et al. | |
| 2010/0250676 A1* | 9/2010 | Ufford | G06Q 10/107 |
| | | | 709/204 |
| 2011/0137789 A1* | 6/2011 | Kortina | G06Q 40/025 |
| | | | 705/38 |
| 2012/0014507 A1* | 1/2012 | Wu | A61N 5/10 |
| | | | 378/65 |
| 2012/0072384 A1* | 3/2012 | Schreiner | G06Q 30/02 |
| | | | 706/45 |
| 2012/0102332 A1* | 4/2012 | Mullin | H04W 12/0608 |
| | | | 713/186 |
| 2012/0130863 A1 | 5/2012 | Tedjamulia et al. | |
| 2012/0331567 A1* | 12/2012 | Shelton | G06Q 20/102 |
| | | | 726/28 |
| 2013/0086641 A1* | 4/2013 | Mehr | G06F 21/552 |
| | | | 726/4 |
| 2013/0124644 A1* | 5/2013 | Hunt | H04L 51/32 |
| | | | 709/206 |
| 2013/0191898 A1* | 7/2013 | Kraft | G06F 21/31 |
| | | | 726/6 |
| 2013/0219479 A1* | 8/2013 | DeSoto | H04L 63/08 |
| | | | 726/6 |
| 2014/0164218 A1* | 6/2014 | Stewart | G06Q 40/025 |
| | | | 705/38 |
| 2014/0258305 A1* | 9/2014 | Kapadia | H04W 4/21 |
| | | | 707/741 |
| 2014/0273978 A1* | 9/2014 | Van Snellenberg | H04W 4/00 |
| | | | 455/412.2 |
| 2014/0279556 A1* | 9/2014 | Priebatsch | G06Q 20/38215 |
| | | | 705/67 |
| 2014/0330732 A1* | 11/2014 | Grignon | G06Q 50/01 |
| | | | 705/319 |
| 2015/0121456 A1* | 4/2015 | Milman | H04L 63/10 |
| | | | 726/3 |
| 2015/0205800 A1 | 7/2015 | Work et al. | |
| 2015/0332169 A1 | 11/2015 | Bivens et al. | |
| 2016/0019614 A1* | 1/2016 | Dziuk | G06Q 30/0613 |
| | | | 705/38 |
| 2016/0070704 A1* | 3/2016 | Yu | G06F 16/9535 |
| | | | 707/723 |
| 2016/0132901 A1* | 5/2016 | Davar | G06Q 30/0201 |
| | | | 705/7.29 |
| 2016/0277424 A1* | 9/2016 | Mawji | G06Q 50/01 |
| 2016/0379182 A1* | 12/2016 | Sheng | G06Q 20/02 |
| | | | 705/44 |
| 2017/0034183 A1* | 2/2017 | Enqvist | G06F 21/552 |

\* cited by examiner

TRUST STAMP

CROSS-REFERENCE TO RELATED APPLICATION

This application claims the benefit of U.S. Provisional Patent Application No. 62/253,538, the entire contents of which is hereby incorporated herein by reference for all purposes as if fully set forth herein, under 35 U.S.C. 119(e).

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR

Not Applicable

BACKGROUND

Unless otherwise indicated herein, the materials described in this section are not prior art to the claims in this application and are not admitted to be prior art by inclusion in this section.

1. Field of the Invention

The present invention relates generally to identity and trustworthiness verification for online users. More specifically, the present invention is a method of identity verification for online users combined with methodologies for evaluating and demonstrating trustworthiness.

2. Description of Related Art

Driver's licenses and state issued identification cards are a common means of providing identification, but may be stolen or forged. Also, while these forms of identification may include a name, address, date of birth, or a photo; they do not provide information regarding the character, social behavior, and trustworthiness of the holder. In addition, not everyone has a driver's license, especially younger people. Furthermore, in some instances these forms of identification may provide more information than the holder wishes to reveal, such as their date of birth, social security number, etc.

Credit searches and other background checks are expensive, highly regulated, and often require a social security number. Also, credit and online background checks do not provide photographs. Therefore, the viewer does not necessarily know if these checks truly relate to the person that is presenting the results. In addition, these checks do not provide evidence as to the moral character, social behaviors, and creditworthy tendencies of the presenter. Furthermore, because of the personal nature of the information requested in performing these checks, they may be regarded as intrusive and offensive. Moreover, these checks may provide little, if any, information in respect to minors and young adults.

Accordingly, there is a need for a method that identifies the trustworthiness of individuals that is quick, inexpensive, accurate, and inoffensive. The method described in this patent application fulfills at least one of these needs or creates other utility.

BRIEF SUMMARY OF THE INVENTION

It is a principal object to solve at least one of the disadvantages with other attempted solutions or to create other utility by providing a method that identifies the trustworthiness of individuals that is quick, inexpensive, accurate, or inoffensive. The present invention relates generally to identity or trustworthiness verification for online users. More specifically, the present invention is a method of identity verification for online users combined with methodologies for evaluating or demonstrating trustworthiness.

The present invention is comprised of a combination of steps and attributes. One step is to obtain data values from various public or private databases over a network to a host computer with a non-transitory computer readable medium regarding the social media, e-commerce, or other data, of an online user, referred to herein as a subscriber, and integrate them into a single accessible report. Another step is to obtain similar information directly from the subscriber. At least one data value and at least one element of subscriber information are then stored on a host computer. An algorithm compares at least one data value with at least one other data value or at least one element of subscriber information from the data collection. Another algorithm weighs these data values or subscriber information depending on their relationship to trustworthiness. A further algorithm generates a rating based on these data values or subscriber information from the preceding data collection, which represents the subscriber's trustworthiness with a numerical score, referred to herein as a "Trust Score." This Trust Score is used in a process known as a "Trust Stamp." A higher numerical Trust Score means a higher level of trustworthiness of the subscriber, while a lower numerical Trust Score means a lower level of trustworthiness of the subscriber.

BRIEF DESCRIPTION OF THE DRAWINGS

The accompanying drawings, which are incorporated in and constitute a part of this specification, illustrate several aspects described below.

DETAILED DESCRIPTION OF THE INVENTION

It is to be understood that this invention is not limited to any particular embodiment described, which may vary. Also, it is to be understood that the terminology used herein is for the purpose of describing particular embodiments only, and is not intended to be limiting, since the scope of this invention will be limited only by the appended claims.

In the following detailed description, numerous specific details are set forth in order to explain and provide a thorough understanding of the present invention. However, it is apparent that the present invention may be practiced without all of these specific details. Thus, all illustrations of the drawings are for the purpose of describing versions of the present invention, and are not intended to limit the scope of the invention.

In the following section, the present invention is described fully by referencing the details in the enclosed drawings, which illustrate certain embodiments of the invention. The numbers shown in this specification refer to the corresponding numbers in the enclosed drawings. The terminology used is to describe the particular embodiment shown and is not intended to limit the scope of the invention. The invention may also be embodied in many other forms in addition to the embodiments shown. Thus, the embodiments shown should not be construed as limiting, but rather, to allow a thorough and complete description of the disclosure that conveys the scope of the invention to a person having ordinary skill in the art in the field of this invention. Therefore, for the terms used herein, the singular forms "the," "a," and "an" are intended to include the plural forms as well as the singular forms, unless the context clearly indicates otherwise. The term "and" includes any and all combinations of one or more of the associated listed items. As used herein, the terms "comprising" and "comprises" when used in this specification, identify specific steps, integers, operations, features, components, and elements, but do not preclude the presence or addition of one or more other steps, operations, features, components, and elements. In addition, the features, components, and elements referenced may be exaggerated for clarity.

Unless otherwise defined, all scientific terms, technical terms, or other terms used herein have the same meaning as the term that is understood by one having ordinary skill in the art in the field of this invention. It is also understood that these terms, including their dictionary meaning, should be understood as having the meaning, which is consistent with their definitions in the related relevant art. In addition, the present disclosure is not to be interpreted in an idealized or overly formal sense unless expressly stated so herein. Constructions or functions that are well known in the art may not be fully described in detail for brevity.

In describing the invention, it is understood that a number of steps and methods may be disclosed. Each of these may have individual benefit. Also, each may be used in conjunction with at least one or more of the disclosed steps and methods. Therefore, this description will refrain from stating each and every possible combination of the individual steps and methods for the sake of brevity. Regardless, the specification and related claims should be understood with the combinations that are entirely within the scope of the claims and inventions.

The disclosure in this invention are examples of how it may be implemented and are not intended to limit the scope of the invention to the specific embodiments shown in the accompanying drawings or the description provided herein. The present invention will now be described by example in the following paragraphs by referencing the accompanying drawings, which represent embodiments and alternative embodiments.

Figure 1:
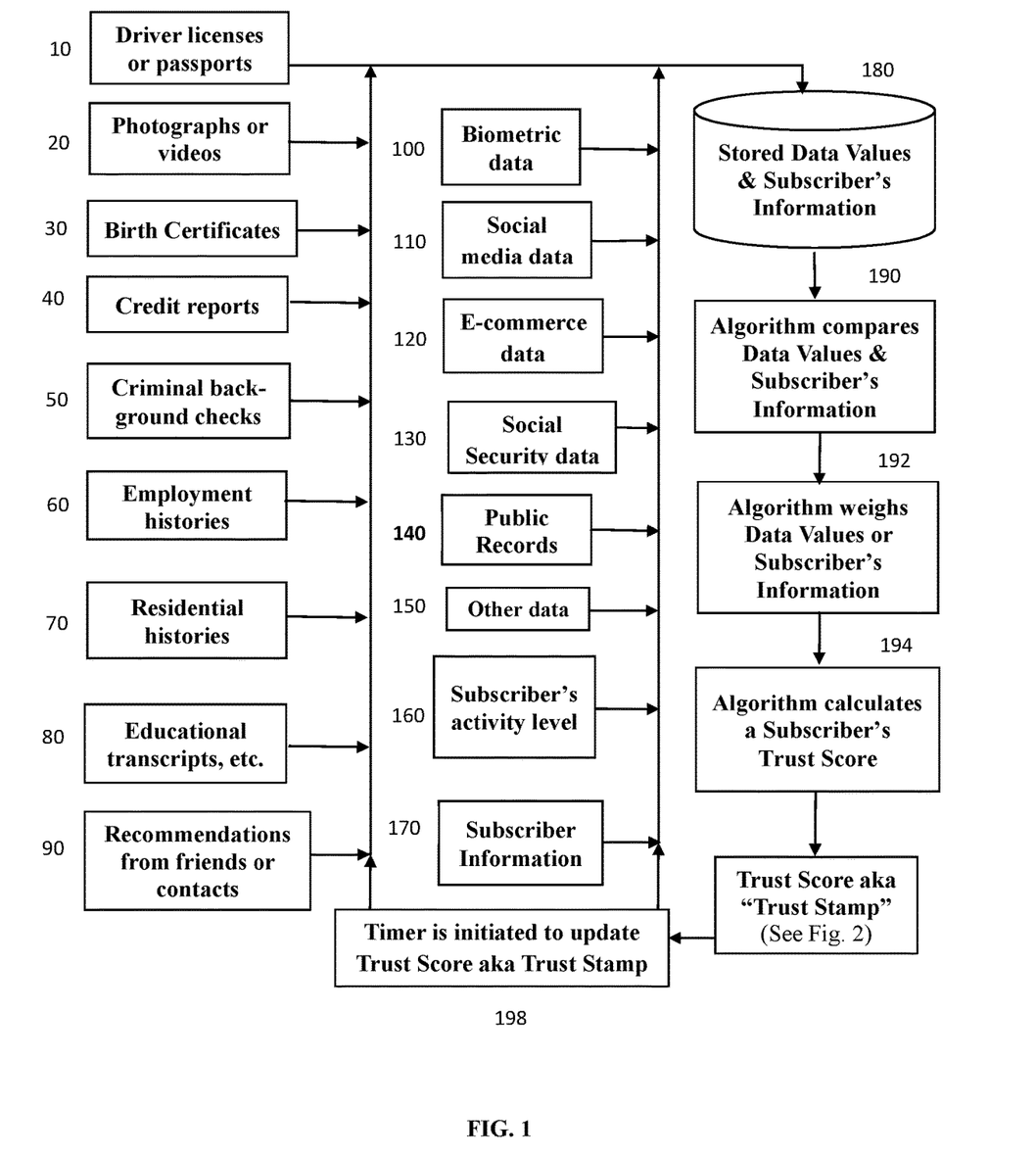
FIG. 1 is a flowchart of the method in which at least one of the embodiments of this invention is implemented.

With reference to FIG. 1, the present invention is a method of determining a numerical value or score related to the trustworthiness of a subscriber. The method comprises receiving data values from various public or private databases or other online sources, over a network to a host computer with a non-transitory computer readable medium. The present invention may suitably comprise, consist of, or consist essentially of, the elements from driver licenses or passports 10, photographs or videos 20, birth certificates 30, credit reports 40, criminal background reports 50, employment histories 60, residential histories 70, educational transcripts or verification of enrollment 80, recommendations of verified contacts or friends 90, biometric data 100, social media data 110, e-commerce data 120, social security data 130, other public records 140, such as resident alien identification, non-driver state issued identification cards, military identification cards, etc., other data 150, or the level of activity by the subscriber 160 (referred to herein as the "Data Values").

The method also comprises receiving information, identifying information, or qualifications from the subscriber 170, which may also include at least one of the Data Values (referred to herein as the "Subscriber Information"). This Subscriber Information is to verify the accuracy of the other Data Values, assist in determining the trustworthiness of the subscriber, or to assist in locating various public or private databases that contain the Data Values. If the subscriber provides identifying information or qualifications that differ from official public documents, this tends to indicate that the subscriber is less trustworthy. Also, if the subscriber has deliberate omissions or inaccuracies in the information he supplies, this may indicate that the subscriber has something to hide. Since this undisclosed information may indicate that the subscriber is untrustworthy, this may cause algorithm 194 to calculate a lower numerical value or lower Trust Score 196 for the subscriber.

The Trust Stamp program may use the subscriber's credentials to provide access to data from the subscriber's accounts by signing-into the accounts as the subscriber. The Trust Stamp program may also use an Application Programming Interface ("API") provided by the social media 110, or e-commerce 120, or other accounts or by any "scraping" mechanism thereby creating a private, but sharable profile of the subscriber.

With reference to FIG. 1, the Data Values and the Subscriber Information are first stored 180 on a host computer with a non-transitory computer readable medium. Next, an algorithm 190 is used to compare the Data Values to each other and to the Subscriber Information for similarities or discrepancies to determine the accuracy or consistency of either the Data Values or the Subscriber Information.

One algorithm compares Data Values or Subscriber Information 190, and another algorithm weighs this data 192, which is then stored on a non-transitory computer readable medium with computer executable instructions. A processor executes these instructions to perform the method of calculating a Trust Score 196 for the subscriber. This method comprises accessing a database in the computer including at least, public or private records data. The algorithm then compares 190, weighs 192, and calculates 194 this data with the option of recommendations from verified contacts and friends to calculate an initial Trust Score 196.

With reference to FIG. 1, after the Trust Score 196 is initially calculated, an interval Timer 198 in the host computer is initiated, so that the time elapsed since the last Trust Score 196 calculation can be monitored. The host computer constantly receives data relating to the current Trust Score 196 of the subscriber. An interval Timer 198 determines the frequency intervals or designated times at which the data is repetitively calculated. In this way, any changes in the public or private records data of the subscriber that effect the Trust Score 196 may be considered in recalculating the Trust Score 196. In this way, the Trust Score 196 of the subscriber is continually updated.

At the intervals designated by the Timer 198, an updated Trust Score 196 is transmitted to a digital badge 220 containing the subscriber's Trust Score 196. This may be embedded into a barcode, such as a two-dimensional barcode, known as a Quick Response Code or QR Code 210. Alternatively, the digital badge 220 containing the subscriber's Trust Score 196 may be embedded into a unique Uniform Resource Locator, which is also known as a URL 230. In this way, the Trust Score 196 of the subscribers may be embedded into a digital badge 220 that is capable of transmitting a Trust Score 196 through a wired connection or wirelessly by publishing it online, in print, through email, through Short Message Service ("SMS"), through Multimedia Messaging Service ("MMS") or by any other similar communication method, such as infrared, Bluetooth, Near Field Communication ("NFC"), or another device-to-device communication method. The Trust Score 196 of the subscriber is continually updated as new Data Values or Subscriber Information is received.

After these updated calculations are performed, a signal may be initiated that controls the data behind the badge 210 or other interface to display the latest Trust Score 196. In this way, updates to the Trust Score 196 may be made based on each element of data based on its relationship to trustworthiness, the number of verified contacts or friends, the trustworthiness of the verified contacts or friends, the quality or strength of the trustworthy recommendations, the duration, frequency or volume of related accounts or transactions to consider its relationship to trustworthiness, other Data Values, or Subscriber Information to generate an updated rating for the subscriber's Trust Score 196.

At least one of the factors to determine a Trust Score 196 is by comparing physical characteristics of a subscriber between two sources with an algorithm 190. One source may be considered to have the subscriber's true identifying characteristics, while the other source has the subscriber's purported identifying characteristics. The subscriber's true identifying characteristics may be based on driver licenses or passports 10, or other public records 140, such as resident alien identification, non-driver state issued identification cards, military identification cards etc., which display the subscriber's identifying characteristics. These identifying characteristics may include the subscriber's photograph, name, address, date of birth, gender, hair color, eye color, height, weight, driving restrictions, citizenship, nationality, or other relevant information. Since these characteristics are from official government documents, they are considered to be generally accurate, and may be used to establish the true baseline identifying characteristics of the subscriber. The algorithm 190 may then compare these true characteristics to other Data Values or the Subscriber Information, including but not limited to the subscriber's purported biometric data 100, photographs or videos 20, or other data 150, to determine if these Data Values match official government documents such as licenses or passports 10 for characteristics, including gender, hair color, eye color, height, weight, etc.

If the purported photographs or videos 20 of the subscriber, either supplied by the subscriber or from online sources, generally match the photograph on his driver's license or passport 10, the subscriber may receive trust points for being truthful, which may then increase his Trust Score 196. If the information either supplied by the subscriber or that is purportedly of the subscriber does not match his photograph from his driver's license or passport 10, the subscriber may be regarded as being less trustworthy, since his physical characteristics cannot be verified. Thus, if the subscriber appears to portray a false depiction of himself, the subscriber's Trust Score 196 may likely be lower.

If the subscriber's Trust Score 196 is reduced because of discrepancies between his driver's license or passport 10, and his purported photographs or videos 20, the subscriber may wish to conduct a further investigation to determine if someone is fraudulently using his identity. Thus, a subscriber receiving a low Trust Score 196, has the benefit of being warned that he may be a victim of identity theft.

At least one of the other factors to determine a Trust Score 196 is by comparing the subscriber's true name with other purported names for consistency or discrepancies with algorithm 190. For example, algorithm 190 may compare the legal name used on a driver license or passport 10, with the name used by the subscriber on other public records 140 regarding the subscriber, his birth certificate 30, or his social security data 130. If the names on these records generally match each other, the subscriber may be considered trustworthy, and may be assigned more numerical trust points to add to his Trust Score 196. This is because matching names make it more likely that the subscriber is being truthful about his identity. On the other hand, if the subscriber is using a different name or an alias, which does not appear to be an adopted name, alias, or a nickname derived from his true name, or without any other basis, this raises the possibility that the subscriber may be using an alias to mask his true identity. If so, this may cause him to lose trust points, which may result in a lower Trust Score 196.

At least one of the other factors to determine a Trust Score 196 for the subscriber is by comparing the true birth date of the subscriber with other source of information about the subscriber that either states his date of birth or otherwise indicates his age or date of birth with algorithm 190. For example, algorithm 190 may compare the Subscriber Information 170, such as his age or date of birth, with other public records 140, his driver license or passport 10, or his birth certificate 30. If the birth date supplied by the subscriber matches the data from these records, the subscriber may receive more trust points for being truthful, which may in turn increase his Trust Score 196. On the other hand, if the Subscriber Information 170 does not match these records, the subscriber may be regarded as being dishonest, which may negatively affect his Trust Score 196. For example, if a subscriber states that his age is different from what is indicated on an official document, such as a birth certificate 30, this raises the presumption that the subscriber is being dishonest.

There could be a number of reasons a subscriber provides false information, such as his date of birth, even though the exact reasons for persons being untruthful about their age is not always known. For example, a person may state that they are younger than they really are on a dating site, so that they may attract younger partners. Also, a person may state they really are younger than they are on a job application, to avoid age discrimination, or if he believes it may increase his chances of being offered a job.

Conversely, a person may state that they are older than they really are to gain access to perks reserved for older persons. For example, these may include access to a retirement community or other senior citizen benefits. Other reasons could include the ability of the subscriber to be old enough to purchase tobacco or alcohol, rent cars, check-in to hotel rooms, or to engage in gambling. Some persons even state on road race registrations that they are older than they really are to increase their chances of winning an age group prize or to gain entry into another race with strict time requirements. By using a Trust Score 196, a race official could avoid verifying every single entry into a race reserved for the fastest competitors by only verifying those entrants with a low Trust Score 196.

Although the exact reason for a person stating a false age is not always known, using a different age than one's true age shows that a person is somewhat dishonest. Thus, this dishonesty may cause him to have a lower Trust Score 196. Therefore, a Trust Score 196 has the ability to quickly characterize a person based on their level of honesty.

At least one of the other factors to determine a Trust Score 196 is by comparing the true birth place of the subscriber with other source of information about the subscriber that either states his place of birth or otherwise indicates where he was likely born with algorithm 190. For example, birth certificates 30 generally state the person's place of birth. Thus, algorithm 190 may compare the location on a subscriber's birth certificate 30 with the Subscriber Information to determine if he is being truthful regarding his place of birth. If there is a match between birth places, algorithm 194 may calculate a higher Trust Score 196 for the subscriber. If there is not a match, algorithm 194 may calculate a lower Trust Score 196 for the subscriber.

Algorithm 190 may also compare the location of birth on a subscriber's birth certificate 30 to other public records 140, such as resident alien identification, non-driver state issued identification cards, military identification cards etc., which may state or otherwise indicate the place of birth. This comparison may then be used to verify if these other records are accurate. If so, algorithm 194 may calculate a higher Trust Score 196 for the subscriber. On the other hand, if these records indicate a different birth place than the birth certificate indicates, this may signal that one of the records is likely fabricated, which may cause algorithm 194 to calculate a lower Trust Score 196 for the subscriber.

For example, algorithm 190 may compare the accuracy of the subscriber's birth certificate 30 to the subscriber's social security number ("SSN") or other data 130. The first three digits of a person's SSN is known as the geographic area of registration, which usually indicates the state or territory where the SSN was issued. This is generally the same as a person's place of birth, since a SSN is generally issued immediately after a person is born, and because a SSN is needed to claim a child as a dependent on an income tax return. Thus, the SSN is usually issued in the same location as where the birth occurred. As a result, the geographic area of registration on a SSN, generally corresponds with the state where the person was born.

Historically, geographic area numbers were generally assigned in ascending order beginning in the northeast region of the U.S. and then moving westward. For the most part, people in the northeast have the lowest area numbers and those on the west coast have the highest area numbers. For example, a SSN beginning with the sequence 000-003 is assigned to N.H., while a SSN beginning with the sequence 575-576 is assigned to Hi.

Although SSN sequences are not in perfect ascending order from the northeast to the west, all states are assigned unique sequences. Thus, the SSN sequence indicates the state where a person's SSN was issued, which is generally the same as where a person was born. For example, sequence 577-579 is assigned to the D.C. Fla. was originally assigned sequence 261-267, and after those numbers were exhausted it was also assigned sequences 589-595. Similarly, Miss. was originally assigned sequence 425-428, and after those numbers were exhausted it was also assigned sequences 587-588. Also, Calif. was originally assigned sequence 545-573 and later assigned sequence 602-626.

There are a number of reasons why a subscriber's SSN may differ from the state of birth stated on his birth certificate 30. However, if algorithm 190 determines that the subscriber's SSN sequence does not match his place of birth on his birth certificate 30, then algorithm 194 may calculate a lower Trust Score 196 because, there is a possibility that the subscriber is being untruthful.

Note that sequences 650-699 and 729-999 were never assigned to anyone. Thus, if the subscriber's SSN begins with one of these sequences, which were never assigned, this may also result in algorithm 194 calculating a lower Trust Score 196.

At least one of the other factors to determine a Trust Score 196 is by comparing the current residence of the subscriber with other source of information about the subscriber that either states his place of residence or otherwise indicates to where he likely resides with algorithm 190. For example, algorithm 190 may compare the subscriber's residential address as stated in the Subscriber Information with the location of the subscriber's employment 60, credit report 40, or residential history 70. If there is a discrepancy between this information, the algorithm 194 may calculate a lower Trust Score 196 for the subscriber. Otherwise, if the information matches, the algorithm 194 may calculate a higher Trust Score 196 for the subscriber.

Other information that the subscriber may be asked to supply could involve information about where he resides, such as the square footage of his home, the number of bedrooms or baths in his home, or similar information. If other data 150 from an online source shows discrepancies in this information, the subscriber may be considered somewhat dishonest and may be given a lower Trust Score 196.

At least one of the other factors to determine a Trust Score 196 is by analyzing information in the subscriber's criminal background report 50. A subscriber may be given a lower Trust Score 196 if his criminal background report 50 shows that he is likely to engage in dishonest activities, which may tend to indicate that he is not trustworthy. Also, if a subscriber has more extreme moving vehicle violations such as engaging in a speed contest, a hit-and-run, reckless driving, or another potential life-threatening act, this may indicate the subscriber has a general disregard for the law, which may also indicate he is untrustworthy. Thus, for these major violations of the law, algorithm 192 may place greater weight on them, meaning that the subscriber may be considered less trustworthy, which may cause algorithm 194 to calculate a lower Trust Score 196 for the subscriber.

On the other hand, if the subscriber has a criminal background report 50 that shows only minor driving violations, such as parking tickets or driving slightly over the speed limit, algorithm 194 may not necessarily have any effect on a person's Trust Score 196, since such violations may not necessarily indicate that a person is untrustworthy.

At least one of the other factors to determine a Trust Score 196 is by comparing educational records 80, such as transcripts or records of attendance for the subscriber. For example, a subscriber's educational records 80, may be compared with algorithm 190 to information supplied by the subscriber to determine if he is being truthful regarding the schools he attended, the grades he received, or the degrees that he obtained.

A subscriber's Trust Score 196 may also be based on analyzing educational records 80 themselves. For example, a subscriber's educational records 80, may be analyzed with algorithm 192. If the analysis of the subscriber's transcripts with algorithm 192 shows that he was engaged in fraudulent activities, such as plagiarism, cheating, or other forms of academic dishonesty, algorithm 194 may cause less trust points to be added to the subscriber's Trust Score 196, which may lower his Trust Score 196.

Also, if the Subscriber Information states that he either attended or graduated from a particular school, but that an educational transcript 60 or other record of attendance cannot be obtained from the particular school to verify this, algorithm 194 may also calculate a lower Trust Score 196 for the subscriber.

If the subscriber's educational records 80 cannot be obtained, information supplied by the subscriber, could be compared to other sources of information regarding the subscriber. For example, if the subscriber claims to have attended a particular school in person, but other information shows that he was living elsewhere during this time, he may likely be assigned a lower Trust Score 196. On the other hand, if the subscriber was at least residing in the city where the school is located, he may be assigned some trust points, although not as many as may be assigned if his enrollment could be verified.

At least one of the other factors to determine a Trust Score 196 is by analyzing the number of recommendations from the subscriber's verified contacts or friends 90. If the subscriber has a relatively large number of verified contacts or friends providing recommendations, algorithm 192 may place a greater weight on these recommendations, which may in turn cause algorithm 194 to calculate a higher Trust Score 196 for the subscriber. On the other hand, if the subscriber has a relatively small number of verified contacts or friends providing recommendations, then algorithm 192 may place a lesser weight on those recommendations, which may in turn cause algorithm 194 to calculate a lower Trust Score 196 for the subscriber.

At least one of the other factors to determine a Trust Score 196 is based on the number or longevity of social media data 110, such as Facebook, LinkedIn, Instagram, Twitter, Google+ etc. The larger the number of accounts, the more reliable the data is considered. Similarly, the longer an account has been in existence, the more reliable the data is considered. To the contrary, if only one or a few accounts are available, the data from those accounts may be considered less reliable. Similarly, if an account was just opened or is relatively new, it may be considered less reliable, because sufficient time has not passed for reviewers to have the opportunity to provide either positive or negative feedback.

At least one of the other factors to determine a Trust Score 196 is by analyzing the quality of the recommendations received for the subscriber. For example, algorithm 194 may award a greater number of trust points for stronger trustworthy recommendations for the subscriber, while algorithm 194 may award a lesser number of trust points for weaker trustworthy recommendations.

At least one of the other factors to determine a Trust Score 196 is by analyzing the Trust Score 196 of the subscriber's verified contacts or friends themselves. For example, algorithm 192 may give greater weight to recommendations from verified contacts or friends, who themselves have a higher Trust Score 196. Thus, algorithm 194 may calculate a higher Trust Score 196 for the subscriber, if the recommendations from the subscriber's verified contacts or friends themselves have a higher Trust Score 196. On the other hand, algorithm 192 may give lesser weight to recommendations from the subscriber's verified contacts or friends, who themselves have a lower Trust Score 196, which may result in algorithm 194 calculating a lower Trust Score 196 for the subscriber.

At least one of the other factors to determine a Trust Score 196 is by analyzing the reviews the subscriber receives from e-commerce Internet sites. For example, e-commerce data 120 may be used to determine if the subscriber dealt fairly with customers or sellers in transactions based upon whether he received positive or negative reviews. Algorithm 194 may calculate a higher Trust Score 196 for the subscriber, if the subscriber generally receives positive from e-commerce Internet sites. On the other hand, algorithm 192 may calculate a lower Trust Score 196 for the subscriber, if he generally receives negative reviews.

The Trust Stamp program may also identify or disclose additional social media 110 or e-commerce 120 accounts that the subscriber has not listed. This may assist the subscriber in adding such accounts to their profile, or to alert a viewer to the existence of other accounts. The Trust Stamp program accesses credentials for the subscriber's social media 110, e-commerce 120, or other accounts. These may include, but are not limited to Facebook, Google+, LinkedIn, Twitter, MySpace, or other social media accounts. At the election of the subscriber, the profile may also include information from e-commerce 120 accounts such as E-Bay, Airbnb, YouTube, Amazon, Craig's List, or other e-commerce 120 accounts. Also, social media data 110 may be used to determine if the subscriber is involved in deception. If the subscriber has positive reviews from his e-commerce data 120 or social media data 110, which generally reflects that he is an honest person, then algorithm 194 may calculate a higher Trust Score 196 for the subscriber.

At least one of the other factors to determine a Trust Score 196 is by comparing stored Data Values or Subscriber Information for consistency or discrepancies from the data collection. For example, an algorithm 190 compares all of the stored 180 Data Values or Subscriber Information for their accuracy to determine the trustworthiness of the subscriber. The algorithm 190 is provided on the host computer, and is capable of calculating a Trust Score 196, which is a numerical value for the trustworthiness of the subscriber from the Data Values or Subscriber Information. The algorithm considers similarities or discrepancies between the Data Values themselves or in comparison with the Subscriber Information. In general, a higher Trust Score 196 is generated for similarities, and a lower Trust Score 196 is generated for discrepancies.

After algorithm 192 generates a Trust Score 196 based upon the preceding data collection, the Trust Score 196 may be displayed, which represents the trustworthiness of the subscriber. In this way, the Trust Score 196 is useful in communicating the trustworthiness of the subscriber to others, who wish to vet him, before engaging with him.

The Trust Stamp application comprises the use of a computer program to facilitate the unique process or purpose of collating, verifying, and sharing data related to a subscriber's Trust Score 196. The data is primarily comprised of social media data 110, e-commerce data 120, or other public or open records 140 for the purpose of creating or building trust for a particular user. The Trust Stamp may transmit the Trust Score 196 through a medium such as a token to provide access to such collated data or to communicate a numerical value representing a rating, grade, or score similar to a credit score. The Trust Stamp provides a simple to understand composite rating of the trustworthiness of the user or the subscriber in the form of a Trust Score 196.

To create a Trust Stamp profile, which is based on the subscriber's trustworthiness, the subscriber inputs basic personal identifying information into a program for generating a Trust Stamp profile on a computer or mobile device. The subscriber's profile may be purely quantitative, where it is based on data that may comprise social media interactions 110, e-commerce interactions 120, qualitative incorporating information, evaluations, ratings, or extrapolations of other data 150. The data being considered may also be weighed based on its duration, frequency or volume of related accounts or transactions. The profile may also incorporate identifying features such as photographs or videos 20, addresses, emails, telephone numbers, or other data 150 from public or other records.

In at least one embodiment, the Trust Stamp is created by way of a process where the user, party, or subscriber, creates a portfolio of information relating to his social media 110, e-commerce 120, or other characteristics. The user may wish to create such a portfolio, if he was seeking the trust of a third party. The portfolio may be accessible via the Internet or capable of being shared in whole or part by way of a transmission server comprising a microprocessor and a memory that stores the remote subscriber's preferences for information format, destination address, specified Trust Score ranges, and transmission schedule, sent from a data source over the Internet. This may allow at least part of the portfolio to be assessable by viewers for the purpose of earning or strengthening the viewer's trust in the subscriber.

Figure 2:
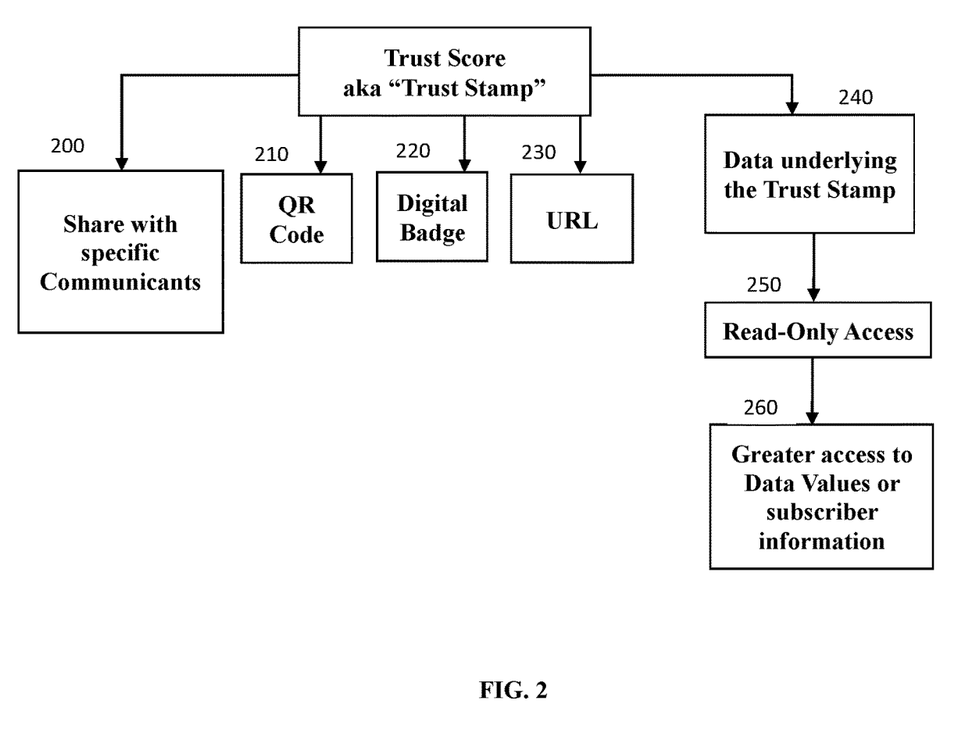
FIG. 2 is a flowchart of the method in which at least one of the embodiments of this invention is implemented.

At least one of the embodiments of this invention is to store Trust Scores 196 for viewing by others by way of a transmission server sent from a data source over the Internet. With reference to FIG. 2, the Trust Stamp process may provide a means for the subscriber to easily share their Trust Stamp, or underlying Trust Score 196, with specific communicants 200 through either a digital badge 220, a unique URL 230, a bar code, such as a two-dimensional bar code known as a QR Code 210, or through another token that incorporates or allows the recipient to access the Trust Stamp as a Trust Score 196. The subscriber may select whether to restrict or make available to the viewer, the data underlying the Trust Stamp 240 with or without the composite Trust Score 196. In addition, the subscriber may select whether the viewer's access to the subscriber's social media 110 or e-commerce accounts 120 is read-only 250 or if there is greater access 260.

The subscriber may have the ability to view his own Trust Stamp by way of a viewer application on a remote subscriber computer just as it may be seen by a third party. In addition, the program may make recommendations as to ways in which the profile or Trust Score 196 could be improved. The subscriber may have the ability to redact certain information, such as his date of birth or social security number. However, to preserve the integrity of the Trust Stamp profile, certain safe guards may be in place to prevent the user from generating a Trust Stamp based on fraudulent information. In addition, the program may indicate the information that was redacted to the viewer, so that it is clear which information was relied upon in generating the Trust Stamp profile.

The Trust Stamp program comprises one or more of the following: (1) a digital badge 220, QR Code 210, or similar medium, which has all of the information to be shared encoded therein; (2) a display or printout of the compiled data; or (3) a dedicated URL 230, wherein the information to be imparted could be stored or accessed. Access credentials, which when used alone or with the Trust Stamp application, may allow the viewer either read-only access 250 or greater access 260 to the information being shared from its original sources. There may be printed or other analog representation of the Trust Stamp, including, but not limited to, advertisements or reproductions on visiting cards or shirts, or other wearable or distributable items. The Trust Stamp manifestation may be provided by the subscriber to the viewer by numerous means. These include, but are not limited to publication online or in print, through email, SMS, MMS, or similar communications or by infrared, Bluetooth, NFC, or other device-to-device communication methods. The Trust Stamp may provide at least one of the following features: (1) a grade, numerical value, or numerical score known as a Trust Score 196 derived from the underlying data; (2) an avatar, shield, badge 210 or other visual representation associated with specific characteristics or a grade or Trust Score 196; (3) speech or the display by any means of a noise or color; or (4) limitation of communication to specific viewers.

The Trust Stamp program may also include a method of distributing Trust Score 196 over a network to a remote subscriber computer. This method comprises providing a Trust Score 196 viewer application to a subscriber for installation on the remote subscriber computer. A numerical value representing the trustworthiness score may be received at a transmission server sent from a data source over the Internet, the transmission server comprising a microprocessor and a memory that stores the remote subscriber's preferences for information format, destination address, specified Trust Score 196 ranges, and transmission schedule. Thus, if a viewer was interested in contacting persons with a Trust Score 196 in a specified range, the viewer could specify these ranges, and have persons within this particular Trust Score 196 range brought to his attention. This may be performed by a remote computer containing a microprocessor, which filters the Trust Score 196 received by the viewer by comparing the received Trust Score 196 to the Trust Score 196 range that the viewer specified. The remote computer may generate a Trust Score 196 alert from the filtered Trust Score 196 that contains a transmitting subscribers name, Trust Score 196 or a digital badge 220, which specifies the location of the data source. The remote subscriber computer may then format the Trust Score 196 alert into data blocks according to said information format; and then transmit the formatted Trust Score 196 alert over a wireless communication channel to a wireless device associated with a subscriber based upon the destination address and transmission schedule.

An alert may activate the Trust Score 196 viewer application to cause the Trust Score 196 alert to display on the remote subscriber computer to enable connection via the digital badge to the data source over the Internet when the wireless device is locally connected to the remote subscriber computer and the remote subscriber computer comes online.

There is a substantial and increasing volume of peer-to-peer and business-to-consumer commerce facilitated by the Internet in the course of which businesses and individuals conduct transactions with persons that were not previously known to them. Thus, there is a need to allow full and unconditional trust in their identity, appearance, moral character, social, or behavioral tendencies. In any of these applications, an individual may initiate the Trust Score 196 process for a number of platforms, including but not limited to peer-to-peer, peer-to-business, enterprise, e-commerce 120 or social media 110. These platforms may use a Trust Stamp as an option or as part of an overall service package. In any of these applications, the viewer may be provided with a mixer-style dashboard similar to a music mixing console viewer for installation on the remote subscriber computer. This may permit the viewer to see the Trust Score 196 weights that are applied by algorithm 192. This may also permit the viewer to adjust the Trust Score 196 weights that are applied by algorithm 192. As a result, the viewer may adjust the weight placed on the underlying data 240 to enable him to select the variable combinations of weightings based upon the criteria in which the viewer has the greatest confidence.

Also, in any of these applications, an icon, image, photograph of the subscriber, or a similar representation may be uploaded to Trust Stamp by the subscriber. This photograph may then be used in an image search on a social media 110 site or e-commerce 120 platform to find additional sources of data related to the subscriber to determine if the image is that of the subscriber. In addition, in any of these applications, the data obtained and any inconsistencies therein may be used to predict the future likelihood of stipulated behaviors. This may be similar to the manner in which credit data is used to predict the likelihood of a borrower defaulting on an obligation.

Under current systems, it may be embarrassing or time consuming for a viewer of data to ask a stranger, who may be a potential subscriber, for access to all of their social media 110 or e-commerce 120 accounts. Also, the potential viewer may be required to obtain from the stranger access credentials that could expose them to identity theft or other improper conduct. Additionally, such a process may not allow for spontaneous or time critical sharing of data. On the other hand, a Trust Stamp may allow a subscriber to instantly share 200 their data with a viewer on a device-to-device basis. This may allow the viewer to immediately evaluate the data before deciding upon further interaction with them within a social or business encounter.

Figure 3:
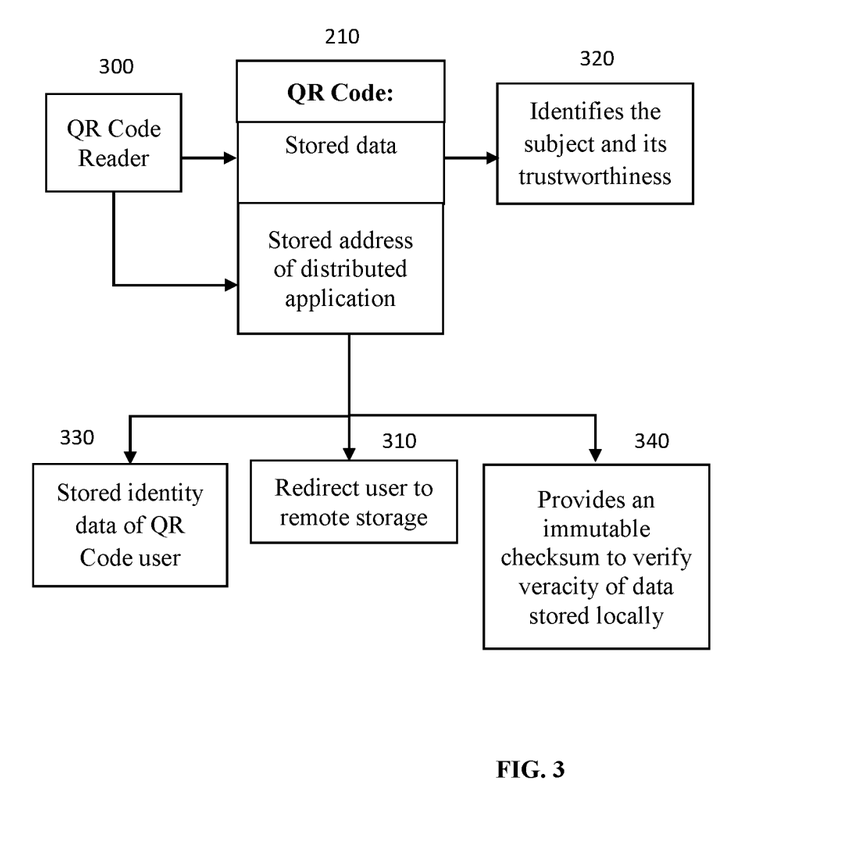
FIG. 3 is a flowchart of the method in which at least one of the embodiments of this invention is implemented.

At least one of the embodiments of this invention is to transmit Trust Scores 196 for viewing by others on an application that a subscriber may install on a remote subscriber computer. With reference to FIG. 3, a subscriber could store or make available their Trust Stamp in an accessible token, device or other storage medium, including but not limited to a cellular telephone, near-field tag, or QR Code 210. For example, a QR Code 210 could be placed on a badge 210 or displayed upon an article of clothing or other accessory worn by the subscriber. This may allow potential viewers to obtain access to the subscriber's Trust Stamp data when the QR Code 210 is within range of a storage medium or QR Code Reader 300. This range may be limited to the same room, building, or other social setting. Access may require express permission to restrict the viewers with access. This mode of transmission may allow a viewer to discretely or anonymously review the subscriber's Trust Score 196 in data determining whether to engage with the subscriber 320.

The Trust Stamp program creates a method for every person that seeks to establish their trustworthiness, credentials, or bona fides, or to verify those of another without engaging in an extensive, time consuming, or offensive background check. On the other hand, the refusal of a person to use such a service raises suspicion that the person may not be trustworthy, which may result in them being assigned a relatively low Trust Score 196. The subscriber may provide their Trust Stamp directly to someone who is soliciting their trust or publish it for all to access it. The Trust Stamp may be granted on a case by case basis either by allowing the viewer read-only access 250 or greater access 260. The Trust Stamp may be issued to a specific viewer on a valid-until-cancelled basis, or it may be made public or published for everyone having access in a particular location. In addition, the viewer may, with or without the involvement of the subscriber, directly compile the requisite data 310.

Possible variations in the Trust Stamp include that the Trust Stamp can provide different levels or selections of data 310. The Trust Stamp data could be represented by the design or color of the Stamp, or any other visual, numerical or linguistic distinction. For example, a "Green" Stamp could provide quantitative data in respect of the accounts disclosed. These may include the following: (a) the length of time that the account has been in use; (b) the frequency of such access; (c) the last access date; (d) the number of counterparties, such as friends or contacts etc.; or (e) the number of third party endorsements. In another example, a stamp such as the "Silver" Stamp could add information, which may include (a) profile photos, (b) mailing addresses, (c) telephone numbers, or (d) email addresses. In a further example, a "Gold" Stamp could allow limited time access to view some or all of the subscriber's social media accounts with or without the ability to post. In at least one embodiment, a higher or different level of authority may grant the viewer full "friend" status on some or each of the accounts listed by the subscriber. There could also be a higher or different level of authority that allows viewers to view or record recommendations or critiques. There could also be a higher or different level of authority that allows viewers to view the subscriber's full or partial social security number and full or partial date of birth.

The Trust Stamp program may be used as an algorithm to create a credit score type number or a grade, status level, or designation communicating a cumulative trustworthiness rating. The Trust Stamp program may collect data from public records 140, publish such data as a whole, fill in gaps in the data obtained from social media 110 or e-commerce 120 sources, and verify such social media 110 or e-commerce data 120 to identify inconsistencies.

The Trust Stamp data viewer may access the data shared by means that may include: (1) a program installed on a computer, tablet, cell phone, or other device; (2) a web browser; (3) a dedicated third party application, or (4) a ubiquitous third party application such as a QR Code 210 viewer, PDF, document viewer, software program, printed media, or otherwise reproduced media. For example, the data provided to the viewer by a QR Code 210 may give the viewer access to a dedicated web address at which the relevant data is collected and stored for access by anyone with valid access credentials 330. In this way, the Trust Stamp data provides an immutable checksum to verify the veracity of data stored locally 340.

In at least one embodiment, a viewer, such as a lender, insurer, landlord or employer, who is seeking to determine the degree of trustworthiness of a third party (the subscriber) may utilize the Trust Stamp process. To do so, the viewer may create credentials provided by the subscriber, or view credentials that the subscriber has made available to the viewer. In doing so, the subscriber allows access to the viewer of a portfolio of information related to their social media 110, e-commerce 120 or other characteristics via the Internet or another communications device. The viewer may review the subscriber's portfolio of information in the form of a Trust Stamp for the purpose of evaluating the risk or advantages involved in transacting with the subscriber on a commercial or personal basis.

In at least one embodiment, a viewer such as a lender, insurer, landlord or employer, who is seeking to determine the degree of trust that it should have in a third party (the subscriber), provides an input, where a subscriber provides credentials or allows the viewer to access the subscriber's portfolio of information related to their social media 110, e-commerce 120 or other characteristics. Such information is accessible via the Internet or another communication device for the purpose of evaluating the risk or advantages involved in transacting with the subscriber on a commercial or personal basis. In this application the Trust Stamp may incorporate traditional credit reports 40 or criminal background reports 50.

In at least one embodiment, the Trust Stamp may be used to verify the identity, bona fides, age, image or other physical or social characteristics of individuals on dating, matchmaking, or friend-finder sites, including applications such as Tinder, eHarmony, Match Group, etc. Verification of such bona fides can avoid mismatches due to inaccuracies and reduce the likelihood of unpleasant, disappointing, dangerous or criminal encounters.

Further, businesses or individuals, who undertake face-to-face communications or facilitate transactions that involve a degree of trust may want to confirm the identity or character of the person with whom they are doing business or otherwise relating. This may include the sale or purchase of goods, acceptance of checks, making of loans, provision of insurance, admission of students to a school or college, meeting prospective clients, admission of members to a club, engagement of babysitters, employment of new hires or independent contractors, rental or sale of real estate, boats, cars or other items. Employers may also like to avoid hiring dishonest persons, who may steal office supplies or submit false time sheets. Trust Stamp can also be used in such situation to verify identity, trustworthiness, behavioral or social attributes.

Further, individuals often seek to get to know or meet strangers with whom they believe that they have a common interest or legitimate connection. This may be for the purposes of networking, support, friendship, intimacy, romance, hobbies, pastimes or other relationships. These individuals need to be assured of the identity, appearance, bona fides, social or behavioral tendencies of the individual before placing trust in them and especially before meeting them. Also, such verification and research needs exist for those charged with safeguarding another person. This may include a parent or guardian wanting to establish the bona fides of an individual with whom their child is spending time or a school or charitable organization engaging volunteers.

There are also situations in which the trust must flow both ways. For example, it is in the interest of the person extending the trust to utilize available tools to assist in their judgment as to the trustworthiness of the individual seeking their trust. It is also in the interest of the individual seeking such trust to provide evidence of their bona fides to the party potentially extending trust. In some situations, the duty of care applicable to the person extending the trust may require the use of a service such as Trust Stamp provided that such is available or affordable. The Trust Stamp program may provide a mechanism for the simultaneous exchange of bilateral or multilateral Trust Stamps. The Trust Stamp program may also provide an API allowing third parties to access, purchase or rent a full, anonymized, or consolidated version of the Trust Stamp data.

All of these embodiments and the invention disclosed herein are intended to be within the scope herein disclosed. These and other embodiments of the invention will become readily apparent to those skilled in the art from the detailed description of the preferred embodiments having reference to the attached figures, the embodiments not being limited to any particular, preferred embodiments disclosed. Also, the invention disclosed herein suitably may be practiced in the absence of any element which is not specifically disclosed herein.

What is claimed is:

1. A computer-implemented method of determining a numerical score related to a trustworthiness of a subscriber, the computer-implemented method being executed by a processor and comprising the steps of:

receiving data values from various public or private databases over a network to a host computer with a non-transitory computer readable medium;

receiving, from the subscriber at least one element of subscriber information;

storing at least one data value of the data values or the at least one element of the subscriber information on the host computer with the non-transitory computer readable medium;

providing a first algorithm on the host computer capable of comparing the at least one data value to either at least one other data value of the data values or at least one other element of the subscriber information for similarities or discrepancies to determine a consistency of the data values or of the subscriber information;

providing a second algorithm on the host computer capable of analyzing a quantity, longevity, relevance, and accuracy of the data values and of the subscriber information to apply a weight to each of the quantity, the longevity, the relevance, and the accuracy;

providing a third algorithm on the host computer capable of calculating a numerical value for a trustworthiness of the subscriber based on factors contained in the data values and the subscriber information, similarities or discrepancies between the data values or the subscriber information, and the weights applied to the data values or the subscriber information based on the quantity, the longevity, the relevance, or the accuracy, wherein the first, second, and third algorithms are each separate algorithms;

displaying, to the subscriber, a recommendation to redact one or more sensitive attributes corresponding to the subscriber information, wherein redacting the one or more sensitive attributes excludes the one or more sensitive attributes from being included in trustworthiness score calculations;

generating, with the processor, a composite trust score corresponding to the subscriber based upon the first, second, and third algorithms;

displaying the composite trust score to the subscriber;

transmitting, via the processor, the composite trust score to a digital badge worn by the subscriber;

embedding the composite trust score into the digital badge worn by the subscriber;

detecting at least one trigger event, wherein the at least one trigger event comprises detecting a system and/or electronic computing device operable to receive the composite trust score;

in response to detecting a particular trigger event comprising identifying a physically proximate electronic computing device corresponding to a potential viewer, transmitting the composite trust score from the digital badge worn by the subscriber to the potential viewer wirelessly from the group consisting of Short Message Service ("SMS"), Multimedia Messaging Service ("MMS"), infrared, Bluetooth, and Near Field Communication ("NFC"), wherein the potential viewer may be provided with a dashboard that permits the potential viewer to see the composite trust score with variable combinations of weightings of underlying data based upon criteria in which the potential viewer has greatest confidence, wherein the variable combinations of weightings are adjustable responsive to the potential viewer interacting with the dashboard; and continually updating the composite trust score of the subscriber by recalculating the composite trust score based on an interval set by a timer to account for new or updated data values and new or updated subscriber information.

2. A system comprising a non-transitory computer readable medium for calculating a trust score for a subscriber, comprising instructions stored thereon, that when executed on a processor, perform the steps of:

accessing a database in a computer including at least public or private records data, and a plurality of separate algorithms for comparing, analyzing, or evaluating the public or private records data along with trustworthy recommendations from verified contacts or friends, or calculating an initial trust score corresponding to a subscriber;

initiating an interval timer in the computer upon calculation of the initial trust score for monitoring an elapsed time since a last trust score calculation;

constantly receiving data relating to a current trust score of the subscriber;

repetitively calculating in the computer, at frequent intervals during designated times, any changes in the public or private records data of the subscriber;

repetitively comparing in the computer, via a first algorithm of the plurality of separate algorithms and at the frequent intervals during designated times, any changes to the current trust score of the subscriber based on changes to the public or private records data of the subscriber, or initiating a signal that controls data behind a digital badge to display a latest trust score;

analyzing, via a second algorithm of the plurality of separate algorithms, each element of the public or private records data based on its relationship to trustworthiness, a number of the verified contacts or friends, a trustworthiness of the verified contacts or friends, a quality or strength of the trustworthy recommendations, a duration, a frequency or volume of related accounts or transactions to consider its relationship to trustworthiness to place a weight on these variables;

displaying, to the subscriber, a recommendation to redact one or more sensitive attributes corresponding to the public or private records data of the subscriber, wherein redacting the one or more sensitive attributes excludes the one or more sensitive attributes from being included in trustworthiness score calculations; and generating, via a third algorithm of the plurality of separate algorithms, a rating for the subscriber's trustworthiness with a numerical trust score;

detecting at least one trigger event, wherein the at least one trigger event comprises detecting a system and/or electronic computing device operable to receive the subscriber's numerical trust score; and in response to detecting a particular trigger event comprising identifying a physically proximate electronic computing device corresponding to a potential viewer, transmitting the subscriber's numerical trust score from the digital badge worn by the subscriber to the potential viewer wirelessly from the group consisting of Short Message Service ("SMS"), Multimedia Messaging Service ("MMS"), infrared, Bluetooth, and Near Field Communication ("NFC"), wherein the potential viewer may be provided with a dashboard that permits the potential viewer to see the numerical trust score with variable combinations of weightings of the underlying data based upon criteria in which the potential viewer has greatest confidence, wherein the variable combinations of weightings are adjustable responsive to the potential viewer interacting with the dashboard.

3. The system of claim 2, wherein the digital badge containing the subscriber's numerical trust score is embedded into a barcode.

4. The system of claim 2, wherein the digital badge containing the subscriber's numerical trust score is embedded into a two-dimensional barcode.

5. The system of claim 2, wherein the digital badge containing the subscriber's numerical trust score is embedded into a unique uniform resource locator.

6. The system of claim 2, wherein the subscriber's numerical trust score is embedded into the digital badge, wherein the digital badge is operable to transmit the subscriber's numerical trust score through a wired connection or wirelessly, from the group consisting of publishing online, in print, email, short message service, multimedia messaging service, infrared, Bluetooth, near field communication, similar communications, or other device-to-device communication methods.

7. The system of claim 2, wherein the subscriber's numerical trust score is continually updated as new data values are received.

8. The system of claim 2, wherein the potential viewer with or without the involvement of the subscriber could directly compile requisite data to provide different levels or selections of data so that the numerical trust score could be represented by a design color of the numerical trust score, or any other visual, numerical or linguistic distinction, wherein a particular design color is indicative of the subscriber's trustworthiness based on trustworthiness attributes comprising the subscriber's frequency of account use and number of endorsers.

9. The system of claim 2, wherein a higher or different level of authority grants the potential viewer full friend status or limited status on some or each of the accounts listed by the subscriber, which allows viewers to view or record recommendations, critiques, the subscriber's full or partial social security number, or the subscriber's full or partial date of birth.

10. The system of claim 2, further comprising an algorithm to create a credit score type number or a grade, status level, or designation communicating a cumulative trustworthiness rating.

11. The system of claim 2, wherein the processor further performs the step of collecting data from public records to publish such data as a whole, fill in gaps in data obtained from social media or e-commerce sources, or verify such social media or e-commerce data to identify inconsistencies.

12. The system of claim 2, wherein the potential viewer may access data shared by means from the group consisting of a program, a web browser, a dedicated third party application, QR Code viewer, PDF, document viewer, software program, printed media, or reproducible media.

13. The system of claim 2, wherein the display is configured to only display machine-readable data formats.

* * * * *